April 14, 1959
L. D. FAAS
2,881,887
CLUTCH FOR POWER MOWER
Filed April 19, 1954
5 Sheets-Sheet 1
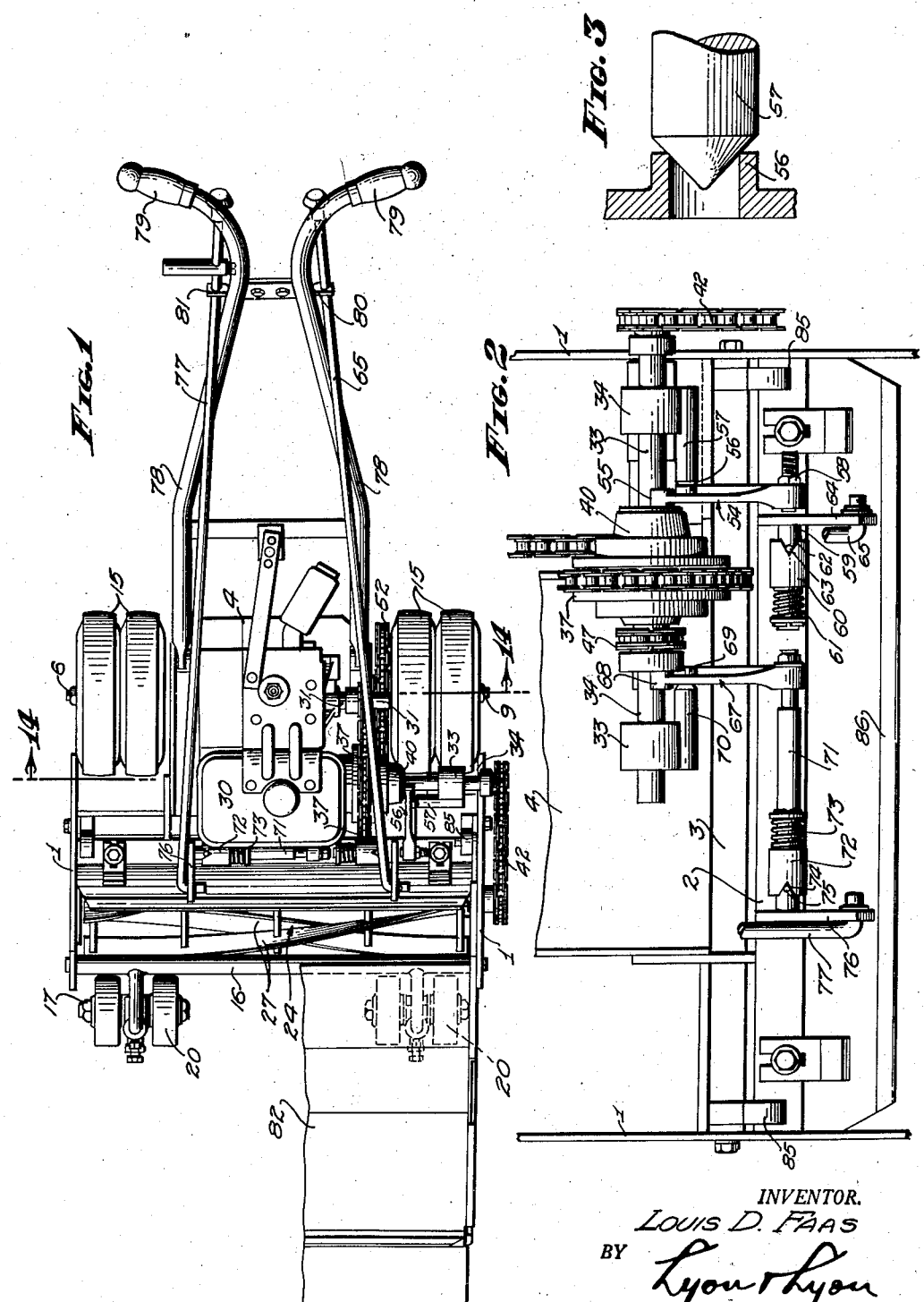
INVENTOR.
LOUIS D. FAAS
BY
Lyon & Lyon
ATTORNEYS April 14, 1959
L. D. FAAS
2,881,887
CLUTCH FOR POWER MOWER
Filed April 19, 1954
5 Sheets-Sheet 2
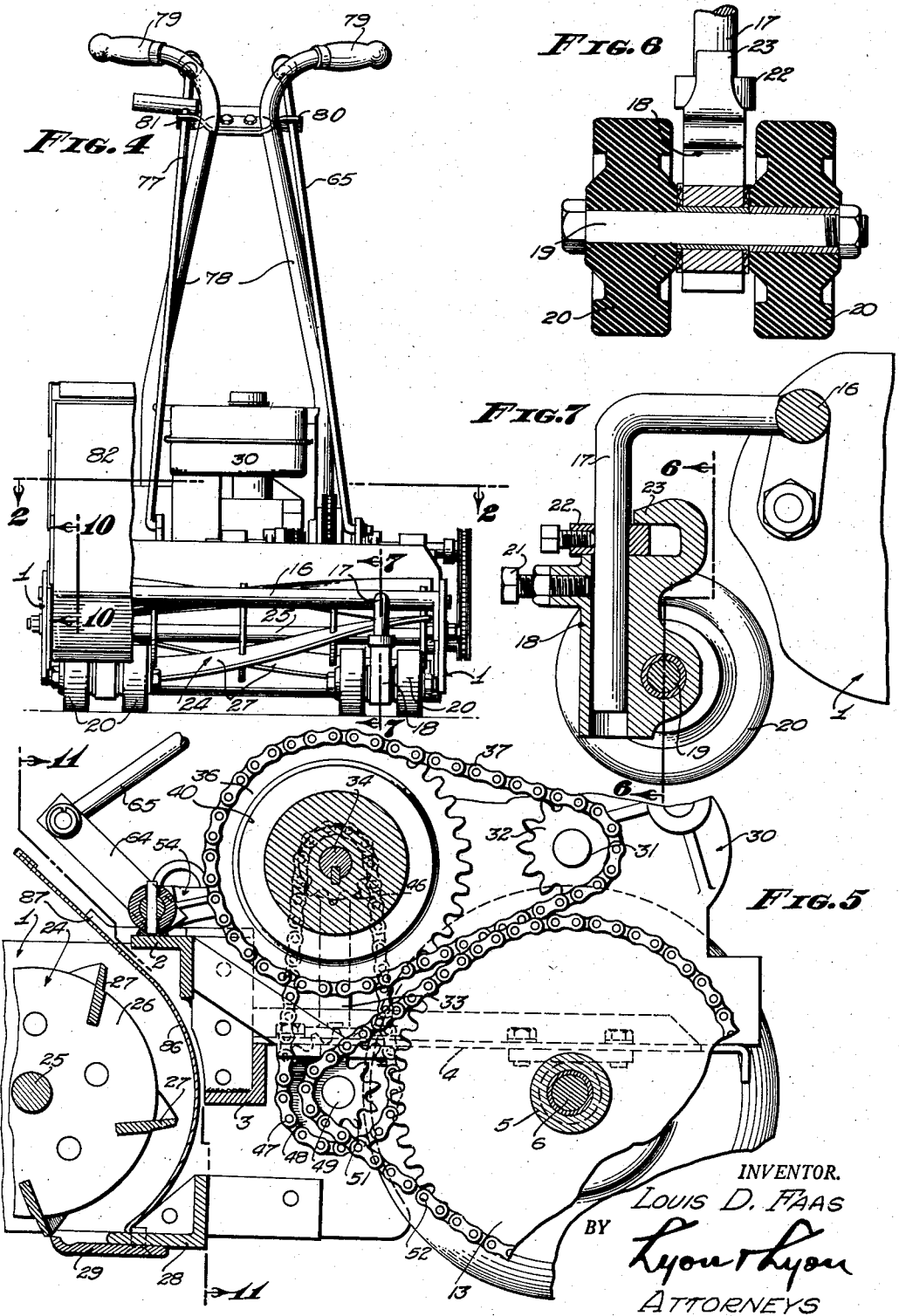
INVENTOR.
LOUIS D. FAAS
BY
Lyon & Lyon
ATTORNEYS

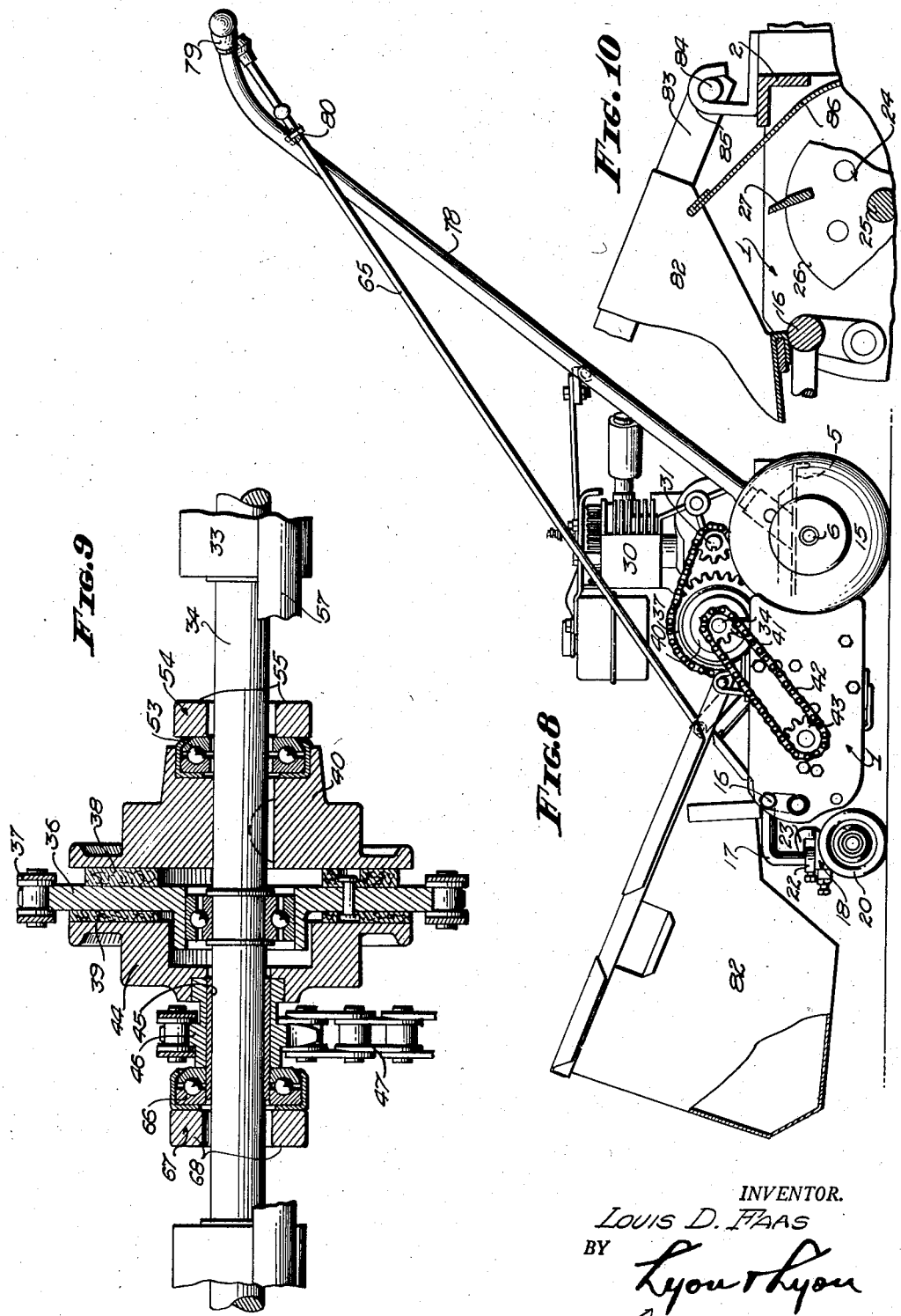

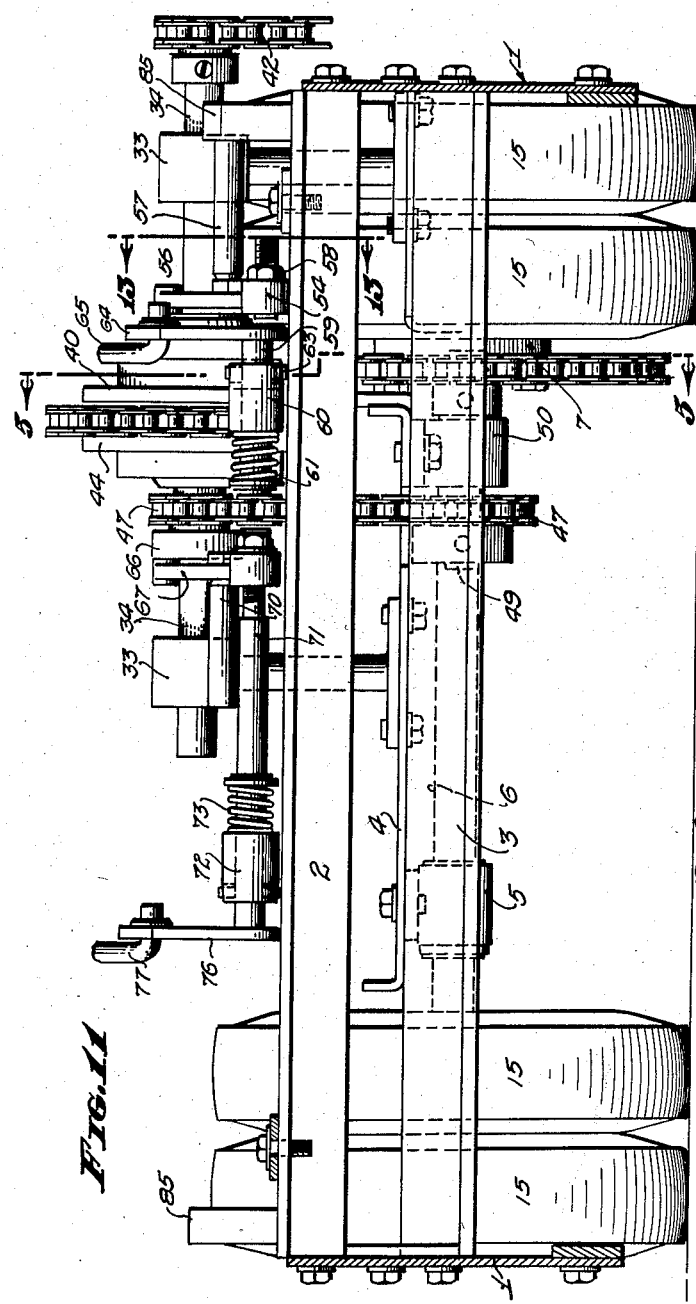
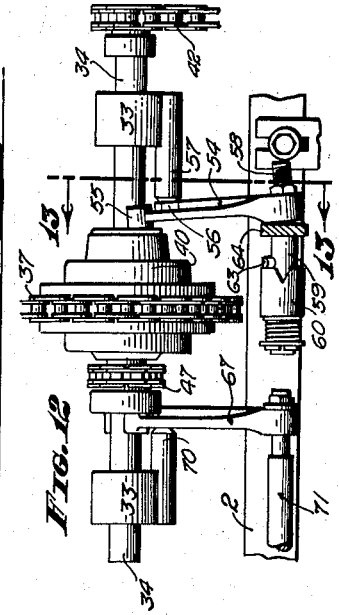
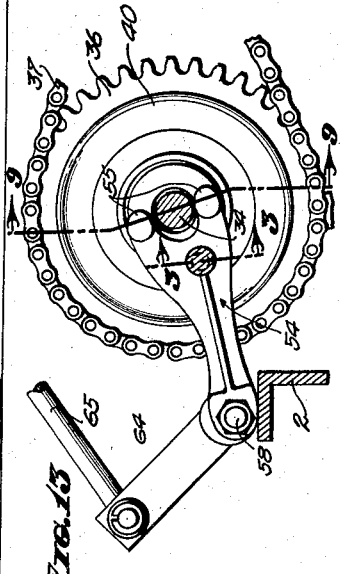

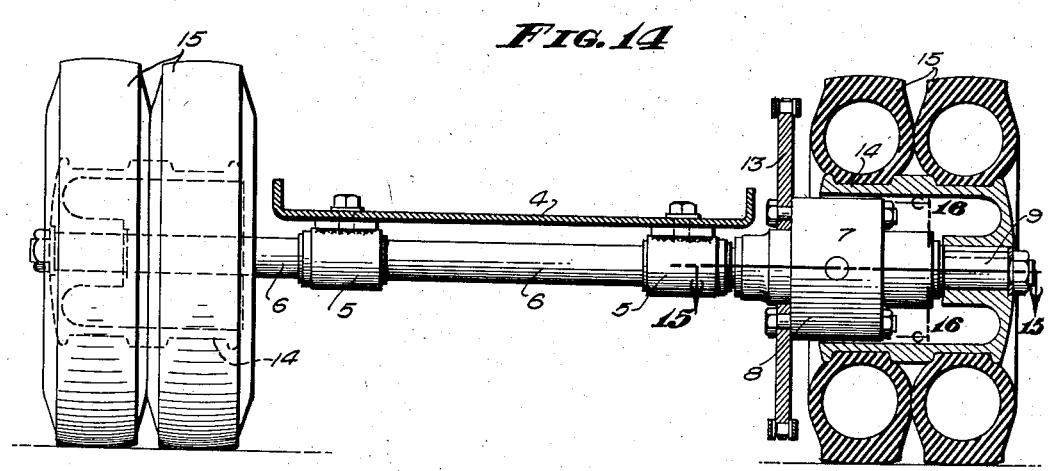
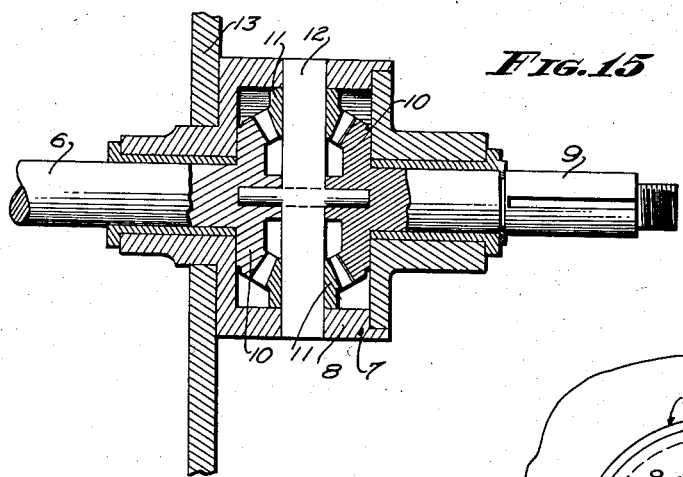
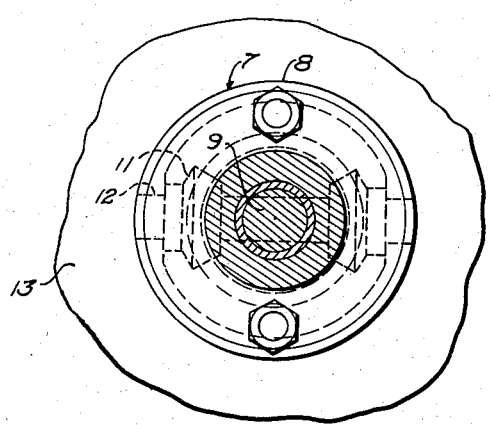

United States Patent Office 2,881,887
Patented Apr. 14, 1959

2,881,887
CLUTCH FOR POWER MOWER
Louis D. Faas, South Gate, Calif.
Application April 19, 1954, Serial No. 424,052
2 Claims. (Cl. 192—48)

My invention relates to power mowers, and included in the objects of my invention are:

First, to provide a power mower which incorporates novel and simple drive means whereby a mower unit or drive wheels may be alternatively or simultaneously operated.

Second, to provide a power mower which incorporates a novel clutch and control means which is easily serviced and maintained in order, even under adverse conditions.

Third, to provide a power mower which is particularly easy to manipulate by reason of a unique differential drive connection to its traction wheels and provision of special caster guide wheels.

Fourth, to provide a power mower wherein the mower blades occupy a maximum proportion of the entire width of the mower, the blades terminating only a fraction of an inch from one side of the mower to permit operation close to walls or other obstructions.

Fifth, to provide a power lawn mower wherein the front idler or caster wheels may be locked in an angular position to facilitate side hill mowing.

With the above and other objects in view, as may appear hereinafter, reference is directed to the accompanying drawings in which:

Figure 1 is a plan view of my lawn mower with the grass catcher shown fragmentarily;

Fig. 2 is an enlarged fragmentary elevational view, taken substantially along the line 2—2 of Fig. 4, showing particularly the clutch mechanism;

Fig. 3 is an enlarged detailed sectional view through 3—3 of Fig. 13, showing the pivot pin for a clutch operating lever;

Fig. 4 is a front view of my lawn mower with the grass catcher shown fragmentarily;

Fig. 5 is an enlarged sectional view through 5—5 of Fig. 11, showing the drive mechanism between the motor and traction wheels;

Fig. 6 is an enlarged fragmentary sectional view through 6—6 of Fig. 7, showing the construction of the front or caster wheels;

Fig. 7 is an enlarged fragmentary sectional view through 7—7 of Fig. 4, showing one of the front or caster wheels;

Fig. 8 is a side view of my lawn mower;

Fig. 9 is an enlarged fragmentary sectional view through 9—9 of Fig. 13, showing the dual clutch means;

Fig. 10 is an enlarged fragmentary sectional view through 10—10 of Fig. 4, showing the manner in which the grass catcher is supported relative to the lawn mower frame;

Fig. 11 is an enlarged sectional view through 11—11 of Fig. 5, showing the clutch and drive mechanism for the traction wheels;

Fig. 12 is a reduced fragmentary plan view, similar to Fig. 2, showing the mower clutch in its engaged position;

Fig. 13 is an enlarged sectional view through 13—13 of Fig. 12, showing particularly the clutch operating lever;

Fig. 14 is an enlarged sectional view through 14—14 of Fig. 1, showing particularly the traction wheels and rear shaft;

Fig. 15 is an enlarged fragmentary sectional view through 15—15 of Fig. 14, showing the differential assembly; and Fig. 16 is an enlarged fragmentary sectional view through 16—16 of Fig. 14, showing an end view of the differential assembly.

My lawn mower is provided with a frame which includes a pair of vertical parallel side plates 1. These side plates are connected intermediate their ends by a cross beam comprising angle bars 2 and 3, joined at their extremities to mounting plates which in turn are secured to the side plates 1. The lower angle bar 3 is joined to the forward margin of a motor supporting platform 4. The platform 4 is provided with underlying bearings 5 which support a rear axle 6, as shown best in Fig. 14.

Near one end the axle 6 is provided with a differential unit 7, which comprises a housing structure 8 from which protrudes a stubshaft 9 in co-axial relation with the axle 6. Within the housing structure the axle 6 and stubshaft 9 are provided with bevel gears 10 which mesh with bevel pinion gears 11 mounted on a shaft 12 anchored in the housing structure 8. A sprocket 13 is secured to the housing structure 8. The rear axle 6 and stubshaft 9 receive wheel hubs 14 which carry dual tires 15.

Adjacent the forward extremities of the side plates 1 there is provided a forward cross bar 16 which carries a pair of bracket bars 17. These bars are extended forwardly and then vertically downward, and each bar is adapted to fit in a vertical bore formed in a caster body 18, as shown best in Fig. 7. The caster body 18 supports a transversely extending caster shaft 19 on which is mounted a pair of caster wheels 20 disposed on opposite sides of the caster body 18. The caster body 18 is equipped with a setscrew 21 so that it may be secured on the corresponding bracket bar 17. In addition, the bracket bar 17 is provided with a collar 22 secured thereto. The upper end of each caster body 18 is provided with a retainer yoke 23 which overlies the collar 22 so as to limit the caster body 18 against axial movement but permit rotation about the vertical axis of the corresponding bracket bar 17.

Mounted between the angle bars 2 and 3 and the forward cross bar 16 is a mower assembly 24 which includes a central shaft 25 and end plates 26 connected by mower blades 27. The blades 27 are so arranged, as shown in Fig. 1, that they extend in close proximity to the side plates 1, so as to reduce to a minimum the distance between the extremities of the blades 27 and the extreme side margins of the mower. Extending between the side plates 1 below the angle bars 2 and 3 is a cutter blade support bar 28 which carries a fixed cutter blade 29 disposed for cooperation with the rotating blades 27.

Mounted on the platform 4 is a motor unit 30 which may be any conventional motor, such as the gasoline motor illustrated, or may be an electric motor. In either case, the motor includes a horizontal laterally directed drive shaft 31 which carries a drive sprocket 32.

Supported from the cross bar 3 on post bearings 33 is a transversely extending clutch shaft 34, shown best in Fig. 9. Mounted on the clutch shaft 34 by means of a bearing 35 is a clutch sprocket 36 connected to the drive sprocket 32 by a chain 37. Secured to opposite faces of the clutch sprocket 36 are clutch disks 38 and 39.

Slidably mounted on the drive shaft 31, but keyed thereto, is a mower clutch member 40. This member rotates the clutch shaft 34. The clutch shaft 34 protrudes slightly beyond one of the side plates 1 and is provided with a sprocket 41 which is connected by a chain 42 to a sprocket 43 secured to the protruding end of the shaft 25, forming a part of the mower assembly 24.

Co-operating with the other clutch disk 39 is a drive clutch member 44 which is journaled on the drive shaft 31 by means of a sleeve bearing 45. The sleeve bearing 45 carries a sprocket 46 connected to the drive clutch member 44 and connected by a chain 47 to a sprocket 48 mounted on a countershaft 49, as shown best in Figs. 5 and 11. The countershaft 49 is located under the motor supporting platform 4 and is supported by a bearing 50. The platform 4 is notched to accommodate the chain 47. The countershaft 49 is provided with a sprocket 51 which is connected by a chain 52 to the sprocket 13 secured to the differential unit 7.

The mower clutch member 40 is equipped with a thrust bearing 53, as shown in Fig. 9, which is engaged by a clutch lever 54, shown in Figs. 1, 2, 3, 11, 12, and 13. The clutch lever 54 includes a yoke end 55 to straddle drive shaft 31 and engage the bearing 53.

Near the yoke end 55 the lever 54 is provided with a fulcrum boss 56 which is engaged by a fulcrum pin 57 rigidly connected to and extending from the adjacent post bearing 33. The remaining extremity of the lever 54 is provided with a setscrew adjustment 58 which engages the end of a shaft 59 slidably and rotatably mounted in a sleeve bearing 60. The shaft 59 is urged in one direction by a spring 61 located between the extremity of the shaft and one end of the sleeve bearing 60. The other end of the sleeve bearing adjacent the setscrew adjustment 58 is provided with a cam notch 62. A pin 63 fixed in the shaft 59 is adapted to ride into and out of the cam notch 62, so as to effect axial movement of the shaft 59 and consequently cause pivotal movement of the clutch lever 54. The shaft 59 is provided with a lever 64 which extends upwardly and is connected to the lower end of a control rod 65.

In a similar manner, the drive clutch member 44 is equipped with a thrust bearing 66 engaged by a lever 67 similar to the lever 54, that is, the lever 67 is provided with a yoke end 68 and adjacent the yoke end is a socket 69 which is engaged by a fulcrum pin 70. The remaining end of the lever 67 adjustably receives one end of a shaft 71 which extends through a sleeve bearing 72. A spring 73 between one end of the sleeve bearing 72 and a shoulder on the shaft 71 urges the shaft toward one extreme position. The opposite end of the sleeve bearing 72 is provided with a cam notch 74 engaged by a pin 75 carried by the shaft 71. This end of the shaft is provided with a lever 76 which is adapted to be attached to the lower end of a control rod 77.

Secured to opposite margins of the motor platform 4, or otherwise conveniently attached to the frame of the mower, is a pair of rearwardly and upwardly extending handle bars 78 terminating in grips 79. Adjacent the grips the handle bars are provided with controlled rod guides 80 and 81 through which the control rods 65 and 77 extend.

Mounted forwardly of the mower frame is a grass catcher 82 having rearwardly extending arms 83 terminating in pins 84 adapted to engage in brackets 85 supported on the cross bar 2 adjacent the side plates 1, as shown in Figs. 1 and 10. The grass catcher also rests on the forward cross bar 16 so as to be suspended above the ground forwardly of the mower, as shown best in Fig. 8. Grass is deflected into the grass catcher from the mower assembly by means of a deflector plate 86, shown best in Fig. 5. The deflector plate 86 is supported by brackets 87 from the cross bar 2 and curves between this cross bar and the support bar 28, clearing the blades 27.

Operation of my lawn mower is as follows:

The mower clutch unit and drive or traction clutch unit are normally disengaged. By pulling on the appropriate control rod 65 or 77 the corresponding clutch may be engaged to operate the traction wheels or the mower assembly. It should be observed that the mower clutch lever 54 and drive clutch lever 67 may be easily removed, permitting the clutch members 40 and 44 to be moved substantially clear of the clutch disks 38 and 39 to permit cleaning of these disks without further disassembly. This is accomplished in the case of the lever 54 by backing off the set screw 58 until the fulcrum boss 56 clears the pin 57, and in the case of the clutch lever 67 by removal of the nut at the end of the shaft 71. Or the pins 63 and 65 may be removed to permit sufficient axial displacement of the shafts 59 and 71 to cause the fulcrum recesses to clear the fulcrum pins. This arrangement is of primary importance in view of the fact that a lawn mower normally operates under adverse conditions which renders it desirable to permit ready cleaning of the clutch disks.

It will be observed that by reason of the differential unit the lawn mower may be manipulated about an extremely short radius to permit trimming around trees and the like.

By reason of the locking arrangement provided for the front or caster wheels 20, operation of the mower along the side of a hill is facilitated. By locking the wheels in proper position the mower may be caused to cut along the side of a slope with a minimum tendency to turn down hill.

Having fully described my invention, it is to be understood that I do not wish to be limited to the details herein set forth but my invention is of the full scope of the appended claims.

I claim:

1. A dual clutch construction, comprising: a clutch shaft; a drive element rotatable on said shaft; a first clutch element keyed to said shaft and frictionally engageable with one side of said drive element; a second clutch element rotatable on said shaft and frictionally engageable with the other side of said drive element; a readily removable clutch lever for each clutch element, each clutch lever having a fulcrum recess intermediate its ends, and a fulcrum pin means radially offset from said shaft and spaced axially from and directed toward said drive element, said fulcrum pin means adapted to bear endwise in each fulcrum recess; a control means for each clutch lever, each of said control means including a guide shaft parallel with said clutch shaft, and a member slidable thereon, said member being capable of movement to free said fulcrum pin means from the fulcrum recess of the corresponding clutch lever thereby to permit removal of said clutch lever; said clutch shaft having sufficient length to permit said clutch elements to slide thereon away from said drive element to permit servicing of said clutch elements.

2. A clutch construction, comprising: a clutch shaft; a driving and a driven element arranged for relative rotational and axial movement on said clutch shaft; a friction clutch element interposed between said driving and driven elements, for effecting a driving connection therebetween, said clutch shaft having sufficient length and said driving and driven elements being axially separable by relative sliding movement on said shaft to expose said friction clutch element for servicing; a clutch operating means including a guide shaft spaced from and parallel with said clutch shaft and a member slidable thereon; a fulcrum pin element between said clutch shaft and said guide shaft and spaced axially from and directed toward said drive element; a readily removable lever disposed with its ends engageable with said driven element and the slidable member of said clutch operating means, and an intermediate recess portion in endwise engagement with said fulcrum pin element and held in engagement with said fulcrum pin element by the engagement of the ends of said lever with said driven element and the slidable member of said clutch operating means; and means movable to permit bodily removal of said lever from said fulcrum pin element thereby to permit access to said friction clutch element.

(References on following page)

References Cited in the file of this patent
UNITED STATES PATENTS

| | | | |
|---|---|---|---|
| 1,240,561 | Gore | Sept. 18, | 1917 |
| 1,661,889 | French et al. | Mar. 6, | 1928 |
| 1,709,791 | Jerram | Apr. 16, | 1929 |
| 1,749,360 | Strout | Mar. 4, | 1930 |
| 1,991,124 | Sharpe | Feb. 12, | 1935 |
| 2,070,288 | Mack | Feb. 9, | 1937 |
| 2,379,023 | Miller | June 26, | 1945 |
| 2,379,024 | Thelander | June 26, | 1945 |
| 2,421,464 | Reiner | June 3, | 1947 |
| 2,555,881 | Gramgroth et al. | June 5, | 1951 |
| 2,767,816 | Hussa | Oct. 23, | 1956 |